United States Patent
Xu

(10) Patent No.: US 7,200,282 B2
(45) Date of Patent: Apr. 3, 2007

(54) IMPLEMENTATION OF HOUGH TRANSFORM AND ITS APPLICATION IN LINE DETECTION AND VIDEO MOTION ANALYSIS

(75) Inventor: Xun Xu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 866 days.

(21) Appl. No.: 10/319,767

(22) Filed: Dec. 12, 2002

(65) Prior Publication Data

US 2003/0123736 A1  Jul. 3, 2003

Related U.S. Application Data

(60) Provisional application No. 60/340,499, filed on Dec. 12, 2001.

(51) Int. Cl.
G06K 9/36 (2006.01)
G06K 9/46 (2006.01)
(52) U.S. Cl. .................................... 382/281; 382/202
(58) Field of Classification Search ............... 382/103, 382/107, 202, 281
See application file for complete search history.

(56) References Cited

U.S. PATENT DOCUMENTS 3,069,654 A   12/1962   Hough

OTHER PUBLICATIONS

Ballard et al. (Computer Vision, 1982, pp. 123-125).*
Kim et al. ("Extracting Lines Using a Modified Hough Transformation", IEEE 6th Multidimensional Signal Processing Workshop, Sep. 6-8, 1989, p. 28).*
Kalviainen, et al., "Motion Detection using Randomized Hough Transform", Proc. 7th Scand. Conf. on Image Analysis, Aalborg, Denmark, Aug. 1991, pp. 72-78.
Kälviäinen, H., et al., "Motion Detection Using Randomized Hough Transform," Proc. 7th Scand. Conf. on Image Analysis, Aalborg, Denmark, Aug. 1991, pp. 72-78.
Samy, Roger, et al., "Moving Object Recognition Using Motion Enhanced Hough Transform," Proceedings of Digital Signal Processing-84; Florence, Italy, Sep. 5-8, 1984, 7 pgs. cover-index, and pp. 770-775.
Sonka, M., et al., "Image Processing, Analysis and Machine Vision," Chapan & Hall, 1993, pp. 507-542.
Yam, S., et al., "Image Registration Using Generalized Hough Transforms," IEEE Computer Society, Proceedings of PR IP-81, Dallas, TX, Aug. 3-5, 1981, pp. i-v, ix, and 526-533.

* cited by examiner

Primary Examiner—Jingge Wu
Assistant Examiner—Yubin Hung
(74) Attorney, Agent, or Firm—Blakely, Sokoloff, Taylor & Zafman LLP

(57) ABSTRACT

An implementation of Hough transform is described. According to one aspect, the Hough transform is used for line detection in an image based on a one-dimensional voting array.

12 Claims, 5 Drawing Sheets

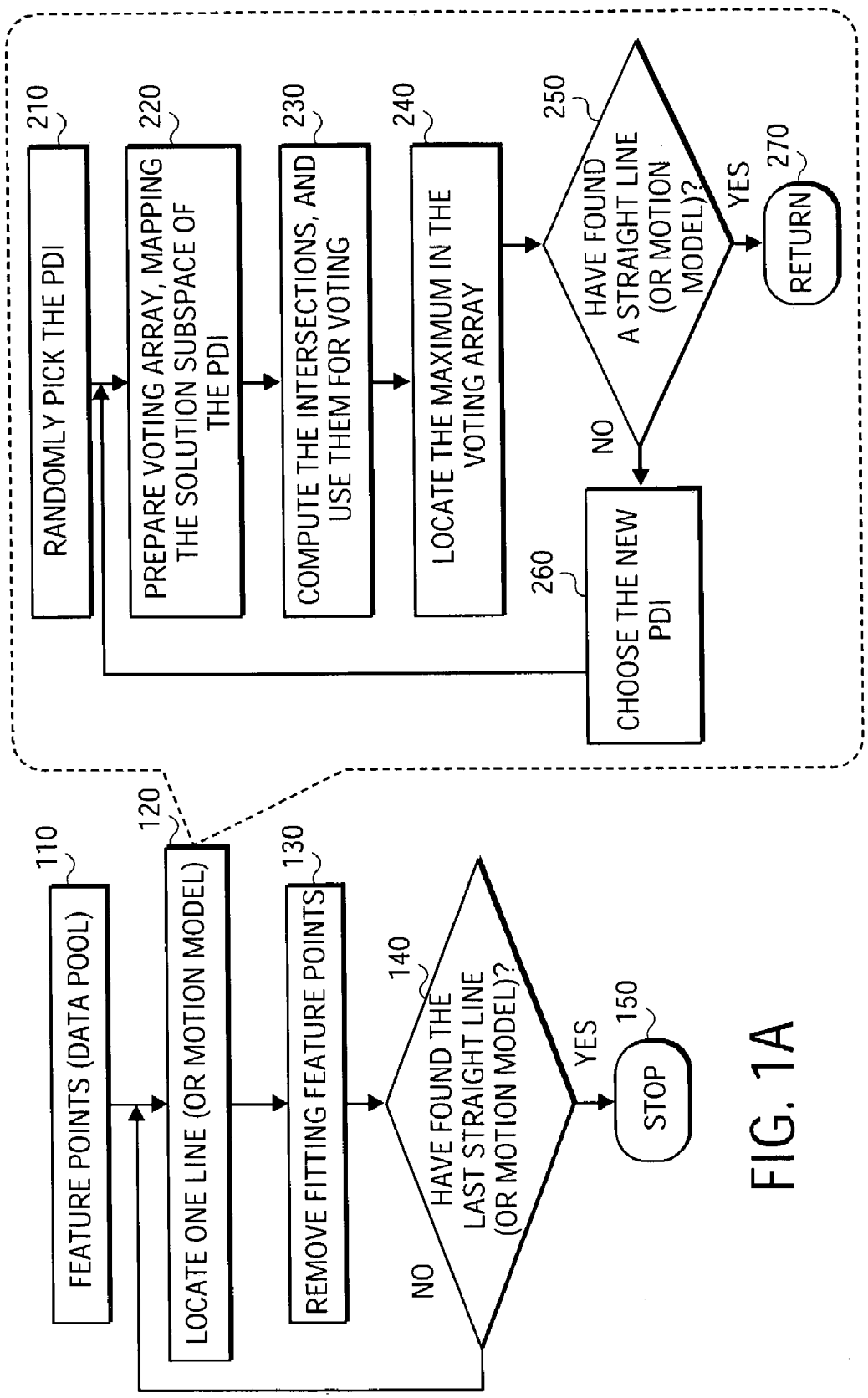

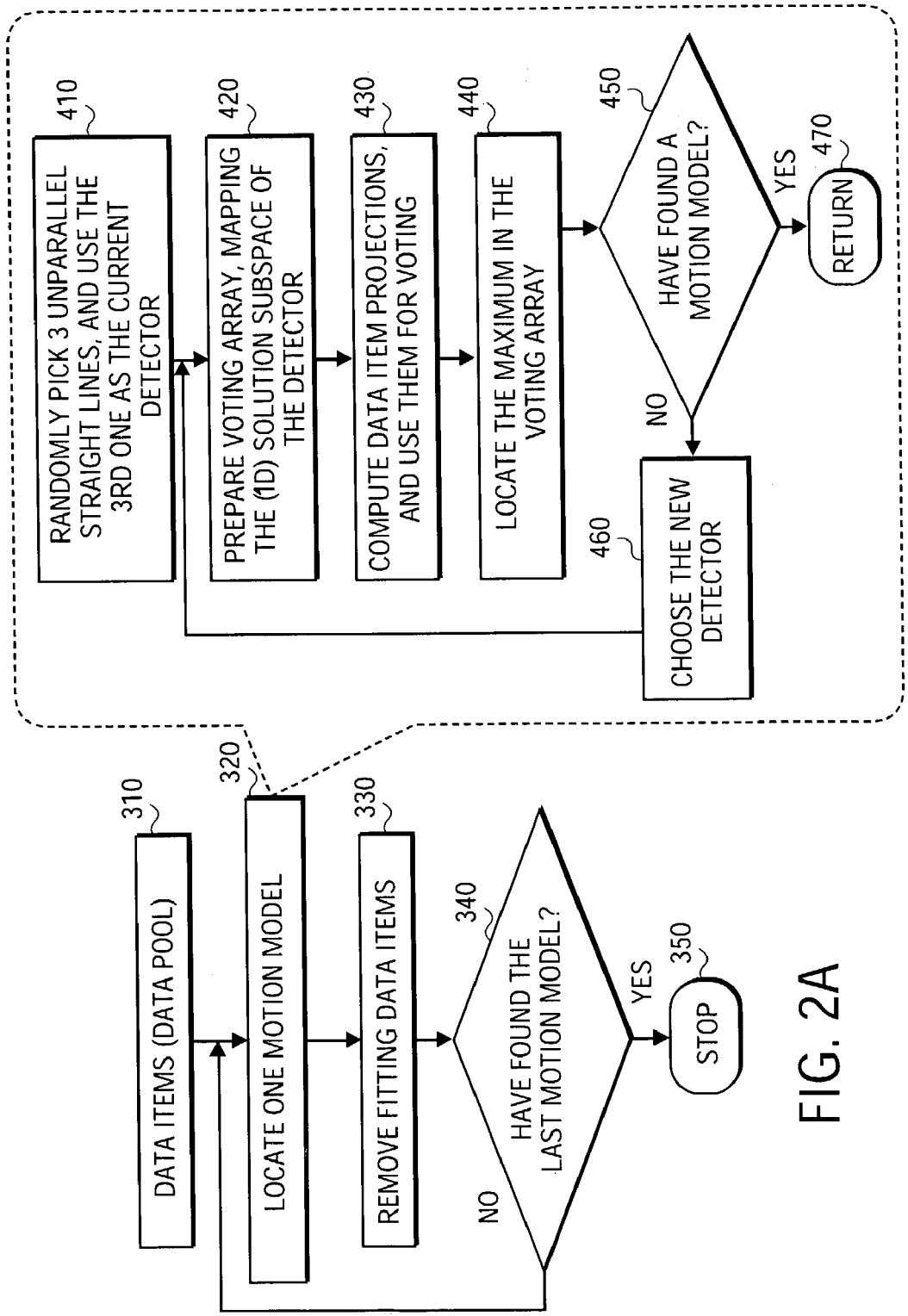

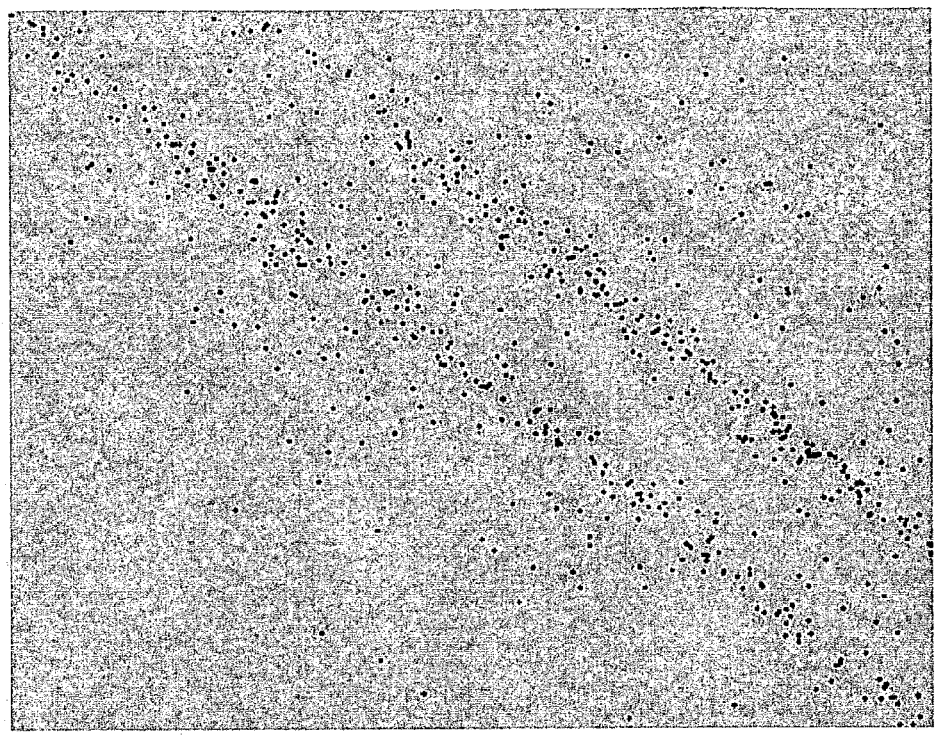
Fig. 3(a)
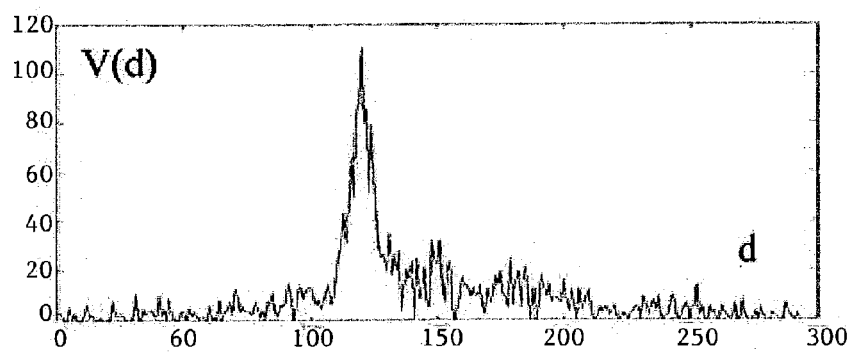
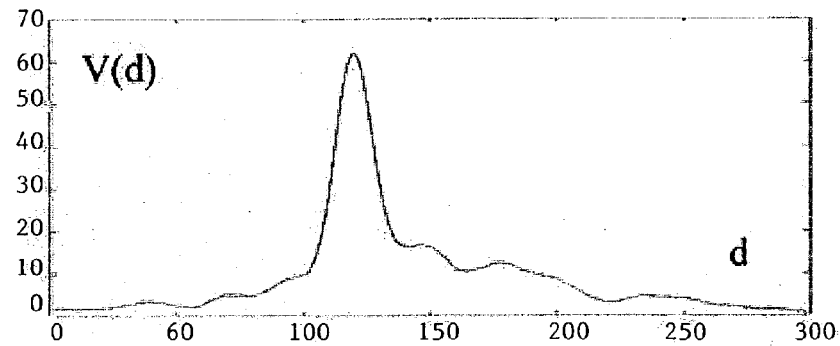
Fig. 3(c)

IMPLEMENTATION OF HOUGH TRANSFORM AND ITS APPLICATION IN LINE DETECTION AND VIDEO MOTION ANALYSIS

CROSS-REFERENCE TO RELATED APPLICATIONS

This application claims the benefit of U.S. Provisional Application No. 60/340,499, filed Dec. 12, 2001.

This application is related to copending patent application Ser. No. 10/318,697, entitled "Implementation of Hough Transform and Its Application in Video Motion Analysis", filed Dec. 12, 2004, and patent application Ser. No. 10/318,857, entitled "implementation of Hough Transform and Its Application in Video Motion Analysis", filed Dec. 12, 2004, each commonly assigned with the present invention.

FIELD OF THE INVENTION

In general, the invention relates to the field of image processing in motion-based video systems. More specifically, the invention relates to pattern detection and analysis based on the Hough transform.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright ©2001, Sony Electronics, Inc., All Rights Reserved.

BACKGROUND OF THE INVENTION

Traditional effectiveness of motion-based video segmentation systems depends on the quality of the motion analysis, which is performed to estimate the motion models between a pair of consecutive frames. That is, a process of determining the corresponding relationship between the locations of a scene point in two consecutive frames. However, in real imagery, it is difficult to determine the multiple motion models because the different objects in a scene have different motions. Traditional, optical flow techniques usually do not work well because the intervals between image acquisitions are not small enough in many applications.

Although estimation techniques based on texture point correspondence do not fail in such applications, it is still difficult to extract multiple global motion models due to the mismatches in point correspondences. These mismatches originate from the image noise, as well as the matching uncertainty, commonly referred to as the "aperture problem."

Variations of Hough transform (HT) have been used to solve the problem of video motion analysis using four-dimensional voting arrays for video motion analysis, under the same conventional principle of using two-dimensional voting arrays for straight line detection. Along with the problem of being insensitive to the imperfect data or noise, using conventional implementations of Hough transform comes at the cost of storage (due in part to the size of the voting arrays) and extensive computation. In addition, these memory and computational consumption problems drastically increase if the number of model parameters increase as is the case of motion analysis.

BRIEF SUMMARY OF EMBODIMENTS OF THE INVENTION

An implementation of Hough transform is described. According to one aspect, the Hough transform is used for line detection in an image based on a one-dimensional voting array.

BRIEF DESCRIPTION OF THE DRAWINGS

The invention may best be understood by referring to the following description and accompanying drawings that are used to illustrate embodiments of the invention. In the drawings:

FIGS. 1A and 1B illustrate a process flow for detecting lines or motion models in a recursive fashion according to one embodiment of the invention;

FIGS. 2A and 2B illustrate a process flow for performing motion analysis on video frames according to an embodiment of the invention;

FIG. 3A illustrates feature points that form lines in an image space according to one embodiment of the invention;

FIG. 3C illustrates voting array values before and after filtering according to one embodiment of the invention;

DETAILED DESCRIPTION

Figure 3B:
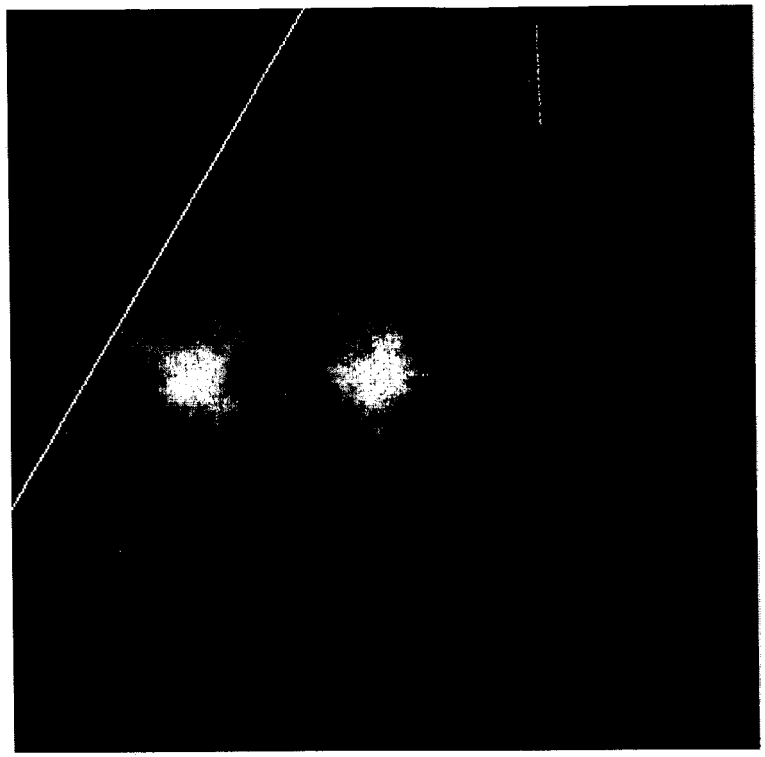
FIG. 3B illustrates a feature points' corresponding P-lines in the parameter space according to one embodiment of the invention.

In the following description, numerous specific details are set forth to provide a thorough understanding of embodiments the invention. However, it is understood that the invention may be practiced without these specific details. In other instances, well-known circuits, structures and techniques have not been shown in detail in order not to obscure the invention. An implementation of Hough transform is described for detecting hidden patterns from corrupted data in an image or video. In general, a pattern is identified when a low-dimensional solution subspace (LDSS) in a parameter space is mapped on a voting array where the maximum voting cell is identified as a new LDSS repeatedly until the slot of the maximum voting cell converges to a point in the parameter space. This point revealing the pattern to be detected.

To facilitate an understanding of this implementation, embodiments of the implementation of Hough transform are disclosed for detecting lines in an image, and performing motion analysis on video frames. However, one of ordinary skill in the art will appreciate that there are alternative ways of using the implementation of Hough transform and that the invention is not limited to the embodiments described herein.

FIG. 1A illustrates a process flow for detecting lines in an image according to one embodiment of the invention, or a process flow for detecting motion models from video frames, according to another embodiment of the invention. For the implementation of line detection, at block 110, a pool of feature points is collected. A feature point (x, y) in an image space defines a line (α,h) (e.g., a P-line) in a parameter space. At block 120, an I-line from the collected feature points is located. The I-line is a line formed by many feature points in the image space. Here, any one of the existing I-lines may be detected. For example, the most prominent lines (e.g., in terms of the shape and supporting feature points) may be detected. At block 130, all of the feature points fitting that I-line are removed. This detecting-removing procedure is repeated (140) on the rest of the feature points, until all the I-lines are detected (150). In one embodiment, a termination criterion may be specified, such as, for example, the specific number of lines to be detected, or a percentage of the feature points to be removed, among other examples.

Figure 3D:
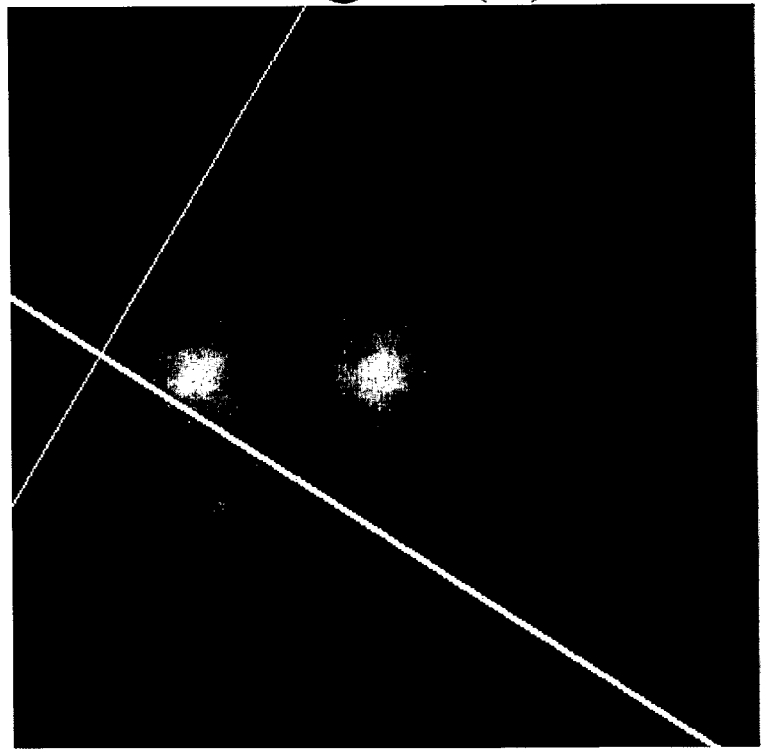
FIG. 3D illustrates a P-line corresponding to a second PDI, according to one embodiment of the invention.

FIG. 1B illustrates a process flow of the line detection of block 120 according to one embodiment (or the motion model detection according to another embodiment). For the implementation of line detection, at block 210, a feature point ($x_k$, $y_k$) is randomly chosen. This feature point is designated a primary data item (PDI). FIG. 3(a) illustrates an example of feature points in an image space. At block 220, a P-line is quantized in the parameter space defined by the PDI, within the limits of α and h. The P-line is a line in the (α, h) parameter space (where h is the length of a normal from the origin to this line and α is the angle with the normal). FIG. 3(b) illustrates the P-line in a parameter space defined by the PDI. In addition, at block 220, a one-dimensional voting array V(d) is formed mapping the quantization, having all elements set to zero. At block 230, in the parameter space, the intersection of the PDI's P-line and the P-line of every other feature point is calculated. Furthermore, at block 230, the intersection (α, h) found is converted into a one-dimensional coordinate d and a corresponding unfiltered vote is generated at cell d (FIG. 3(c) Top). The vote is weighted by the angle θ between the intersecting P-lines. In one embodiment, the vote is weighed more if θ is closer to right angle: V(d)=V(d)+w(θ). It should be understood that the final value of cell d reflects the density and the orthogonality of the intersections at location d. At block 240, the voting array is filtered and the global maximum d* is located (FIG. 3(c) Bottom). In addition, the d*'s two-dimensional corresponding (α*, h*) is computed. At block 250, each feature point, other than the PDI, is rechecked, and another feature point is identified whose corresponding P-line is substantially perpendicular to the line of the PDI, and has the intersection closest to d*, (FIG. 3(d)). If a termination criterion is satisfied, the feature point in the parameter space is returned (at block 270) as a located line in the image space. If a termination criterion is not satisfied, the feature point, at block 250, is selected as the new PDI. The process returns to block 220 with the new PDI and iterates until (α*, h*) converge to a point in the parameter space, which is an I-line formed by the feature points (at block 250) in the image space.

It is well known to those of ordinary skill in the art that a cluster of feature points form an I-line if their corresponding P-lines in the parameter space go through a focus point as shown in FIG. 3(b). The d* in block 240 can be seen as an approximation of the projection of a nearby focus point onto the PDI P-line, where the density and the orthogonality of the intersections tend to be high. It should be understood that, in block 250, the new PDI is chosen, whose corresponding P-line satisfies the following condition $$e < D \tan(\theta/2),\ \theta \in [0, \pi/2] \tag{1}$$

where e is the distance between the focus point's projection and the intersection of the corresponding P-lines of the new and the old PDI. θ is the angle between these two P-lines. D is the distance between the old PDI's P-line and the focus point. It should be appreciated that if this condition is satisfied, the new PDI's corresponding P-line is closer to the focus point. After a few iterations, the PDI P-lines are attracted to the focus point, and (α*, h*) converge to the solution defined by the focus point.

It should be appreciated that this embodiment of an implementation of Hough transform for line detection uses a one-dimensional voting array, and not a two-dimensional voting array as used in conventional line detection techniques, such as, forward projection, backward projection, and feature point pairs implementation of Hough transform well known in the art. Assuming that all of the feature points form m straight lines, and each line has about equal number of supporting feature points, without taking the voting array filtering operations into account, the computational cost is roughly O(mM). It should be understood that in one embodiment, the new Hough transform implementation for line detection could be applied together with a random subset scheme, and thereby cut the computational cost further. That is, this scheme may randomly pick a subset of the feature points (e.g., ten percent) as the input of detection, and thereby computation time is saved because less input data are processed.

The image and the parameter space of the Hough transform using the process flow implementation as described in FIGS. 1A and B, can be expanded to estimate global motions in video frames. Video motion analysis involves estimating the scene motion among each pair of consecutive frames from an input video. In this embodiment, a data pool of data items is collected at block 110 of FIG. 1A. A data item is a set of two equations with four unknowns, which correspond to the pan, tilt, zoom, and rotate of the scene, respectively. Usually, frames have a data item pool of thousands of data items. At block 120, a motion model is located and, at block 130, the data items fitting the motion model are removed from the data pool. This locating and removing process is repeated on the rest of the data items in the data pool, until all the motion models are detected. Again, the termination criteria may be specified, for example, as the number of prominent motion model to be detected, or the percentage of the data items to be removed, among other examples. The task of the Hough transform is to determine the most popular solutions (e.g., the internal coordinates having the most votes, as will be described) supported by the data item equations. The process described in FIG. 1B determines a popular solution.

In one embodiment, a motion model detection problem (and also the straight-line detection problem) can be stated as having the data pool, defined by a set of equations:

$$\begin{aligned} B_1 &= A_1^T X, \\ B_2 &= A_2^T X, \\ &\vdots \\ B_M A_M^T X, . \end{aligned} \tag{2}$$

The task is to determine the most popular solutions $X_1$, $X_2$, ..., supported by the data item equations. In the case of line detection, these are the feature points P-line equations, $$B_1=y_1, A_1=[x_1 1], B_2=y_2, A_2=[x_2 1], \ldots,$$

and the solution X is $[\alpha h]^T$.

In the domain of motion detection, Bs are 2×1 vectors, Xs are 4×1 vectors, As are 4×2 matrices with full rank, and every data item provides two equations, B1, B2, ..., taking the form of $[u_1 v_1]^T$, $[u_2 v_2]^T$, ... This input data are the pixel motion vectors. In one embodiment, the pixel motion vectors may be determined by preprocessing operations such as edge detection and intensity matching of the edge pixels. For example, the analysis for each frame pair may start by matching edge pixels in a pair of consecutive frames, whereby each edge pixel match contributes a data item in the data item pool. The data pool could be corrupted by a large proportion of mismatches that originate from image noises, as well as the matching uncertainty well known to those of ordinary skill in the art.

Here, $A_1^T, A_2^T$ take the form of $$\begin{bmatrix} 1 & 0 & p_{x,1} & p_{y,1} \\ 0 & 1 & p_{y,1} & -p_{x,1} \end{bmatrix}, \begin{bmatrix} 1 & 0 & p_{x,2} & p_{y,2} \\ 0 & 1 & p_{y,2} & -p_{x,2} \end{bmatrix} \quad (3)$$

where the $(p_x, p_y)$ are the image coordinates of the edge pixels. The solution X is a four-dimensional global motion vector $[T^1 T^2 T^3 T^4]^T$ that describes the horizontal and vertical shifting, scaling and rotating motion of components of a motion model.

FIG. 1B illustrates a process flow to determine the solution X according to one embodiment. At block 210, a data item is randomly chosen. This data item is designated as a two-dimensional plane primary data item i.e., $B_k = A_k^T X$. At block 220, the solution subspace in the parameter domain corresponding to the PDI is a two-dimensional plane. Therefore, a two-dimensional voting array is formed having the elements set to zero. At block 230, the intersections are computed between the PDI and every other data item (e.g., $B_1 = A_1^T X$). The intersection X may be defined as:

$$X = \begin{bmatrix} A_k^T \\ A_l^T \end{bmatrix}^{-1} \begin{bmatrix} B_k \\ B_l \end{bmatrix}. \quad (4)$$

Also, computed, at block 230, are the internal coordinates of the intersections in the two-dimensional solution subspace defined by the PDI. Again, the internal coordinates are computed from the four-dimensional point, X, which is an intersection between the PDI and another data item, and X is in the two-dimensional plane defined by the PDI equation $B_k = A_k^T X$, (because X is an intersection involving this PDI). The internal two-dimensional coordinate x may be obtained by calculating:

$$x = F + C^T X, \quad (5)$$

where F is a 2×1 vector, and C is a 4×2 matrix that is given by the right half of the S matrix of the singular value decomposition of $A_k$ defined as:

$$A_k = svd(A_k) = SVD^t = [C_1 C] \begin{bmatrix} v \\ 0 \end{bmatrix} D^T \quad (6)$$

where $C_1$ is a 4×2 matrix that is given by the left half of the S matrix, and V is an orthogonal 4×2 matrix with v being a 2×2 diagonal matrix of the singular values of $A_k$.

In one embodiment, for computational convenience, F is chosen so that the two-dimensional internal coordinate of the projection of $$\begin{bmatrix} 0 \\ 0 \\ 0 \\ 0 \end{bmatrix} \text{ is } \begin{bmatrix} 0 \\ 0 \end{bmatrix}.$$

Accordingly, F is chosen as $$\begin{bmatrix} 0 \\ 0 \end{bmatrix}.$$

In one embodiment, equation (5) generates internal coordinates because its results satisfy the following condition:

$$(X_1 - X_2)^T (X_1 - X_2) = (x_1 - x_2)^T (x_1 - x_2), \quad (7)$$

where $X_1$ and $X_2$ are arbitrary four-dimensional points that both satisfy $B_k = A_k^T X$.

Each intersection between the PDI and another data item generates a vote. Each vote is weighted by the orthogonality of the intersection that is a function of the intersection angle between the intersecting data items. The votes occur to the internal coordinates in the two-dimensional voting array.

In one embodiment, the votes of the more perpendicular intersections are weighed more. The weight of the intersection between the PDI, $B_k = A_k^T X$ and another data item, $B_l = A_l^T X$ is given by the absolute value of the determinant of the matrix $$\begin{bmatrix} A_k^T \\ A_l^T \end{bmatrix}$$

defined as:

$$\text{weight} = \left| det \begin{bmatrix} A_k^T \\ A_l^T \end{bmatrix} \right|. \quad (8)$$

Therefore, by combining equations (4) and (5), x may be defined as:

$$x = F + C^T \begin{bmatrix} A_k^T \\ A_l^T \end{bmatrix}^{-1} \begin{bmatrix} B_k \\ B_l \end{bmatrix}. \quad (9)$$

which is used to calculate the internal two-dimensional coordinate for every data item except the PDI.

At block 240, the voting array is filtered and the global maximum is located. The global maximum being the coordinates of the slot that collects the most votes. The global maximum is converted to the four-dimensional solution X.

In one embodiment, converting two-dimensional internal coordinates into four-dimensional coordinates assume that $\hat{x}$ is the two-dimensional set of the slot that collects the most votes, where the corresponding four-dimensional coordinate $\hat{X}$ is given by solving the equations:

$$\begin{cases} \hat{x} = F + C^T \hat{X} \\ B_k = A_k^T \hat{X} \end{cases} \qquad (10)$$

$$\hat{X} = \begin{bmatrix} C^T \\ A_k^T \end{bmatrix}^{-1} \begin{bmatrix} \hat{x} - F \\ B_k \end{bmatrix}. \qquad (11)$$

At block 250, the data item, which is substaintually perpendicular to the PDI, and whose intersection is closest to the global maximum point, is chosen as the next PDI (at block 260). The process iterates until maximum points converge to a popular solution in the parameter space.

It should be appreciated that since the dimensions of the data items and the solutions are doubled compared to the implementation for line-detection, the solution subspace in the parameter domain corresponding to a PDI is a two-dimensional plane. Therefore, a two-dimensional voting array may be used to perform motion analysis in video, and not a four-dimensional voting array as used by conventional applications of video motion analysis.

Furthermore, an alternative embodiment to the process flow implementation to estimate global motions, as described above, may define simplified equations for C, x, weight, and X, given the A matrices in equation (2) are defined with the format of $$\begin{bmatrix} 1 & 0 \\ 0 & 1 \\ p_x & p_y \\ p_y & -p_x \end{bmatrix}.$$

The top half is a 2×2 identity matrix, the bottom half is created by two variables, $p_x$ and $p_y$. Assuming that the PDI equation is $B_k = A_k^T X$, where $$(A_k = [I \tilde{A}_k])^T, \text{ i.e., } \tilde{A}_k = \begin{bmatrix} p_{x,k} & p_{y,k} \\ p_{y,k} & -p_{x,k} \end{bmatrix}.$$

$(p_{x,k}, p_{y,k})$ is the location of PDI's corresponding edge pixel, for example. This alternative embodiment also assumes that the other data item's equation is $B_l = A_l^T X$, where $A_l = [I \tilde{A}_l]^T$ and $$\tilde{A}_l = \begin{bmatrix} p_{x,l} & p_{y,l} \\ p_{y,l} & -p_{x,l} \end{bmatrix}.$$

Given these assumptions in this alternative embodiment, the C matrix in equations (5), (9), and (11) may be alternatively redefined as:

$$C = \frac{1}{\sqrt{a_k}} \begin{bmatrix} -\tilde{A}_k \\ I \end{bmatrix} \qquad (12)$$

where $a_k = 1 + p_{x,k}^2 + p_{y,k}^2$. Accordingly, equation (5) may be alternatively redefined as:

$$x = F + \frac{1}{\sqrt{a_k}} \begin{bmatrix} -\tilde{A}_k \\ I \end{bmatrix} X. \qquad (13)$$

In addition, when setting F as $$\begin{bmatrix} 0 \\ 0 \end{bmatrix},$$

equation (9) may be alternatively redefined as:

$$x = \frac{1}{\sqrt{a_k}} \left[ \frac{a_k}{b_{k,l}} (\tilde{A}_k - \tilde{A}_l)(B_k - B_l) - \tilde{A}_k B_k \right], \qquad (14)$$

where $b_{k,l} = (p_{x,k} - p_{x,l})^2 + (p_{y,k} - p_{y,l})^2$.

Furthermore, equation (8) may also be alternatively redefined as, $$\text{weight} = b_{k,l}. \qquad (15)$$

Therefore, equation (11) may also be alternatively redefined as, $$\hat{X} = \begin{bmatrix} \dfrac{-\tilde{A}_k^T \hat{x}}{\sqrt{a_k}} + \dfrac{B_k}{a_k} \\ \dfrac{\hat{x}}{\sqrt{a_k}} + \dfrac{\tilde{A}_k^T B_k}{a_k} \end{bmatrix}. \qquad (16)$$

It should be appreciated that equation (16) does not have a 4×4 matrix operation. Therefore, the most complex operation in calculating the popular solution is merely the multiplication of a 2×2 matrix and a 2×1 vector, according to one embodiment.

FIGS. 2A and 2B illustrate yet another embodiment of motion analysis of video frames using an implementation of Hough transform. Comparing FIGS. 1A–B with FIGS. 2A–B illustrate that in this embodiment the primary data items as shown in FIGS. 1A–B are replaced with detectors as shown in FIGS. 2A–B. Furthermore, instead of computing intersections as in FIG. 1B, in this embodiment, projections of the data items on the detector are computed in FIG. 2B. Therefore, detectors are attracted to a solution, as will be described.

As in the previously described approach, the motion analysis problem can be generalized. Given a data pool:

$$B_1 = A_1^T X$$
$$B_2 = A_2^T X$$
$$\vdots$$
$$B_N = A_N^T X \quad (17)$$

where Bs are 2×1 vectors, Xs are 4×1 vectors, and As are 4×2 matrices with full rank, the detection problem is to determine the most popular solutions $X_1, X_2, \ldots$ supported by the data item equations (17). A video motion analysis data pool consists of thousands of two equation/four-unknown data items. In the four-dimensional parameter space, each data item defines a two-dimensional plane. Again, the task is to find the most popular intersection points of these two-dimensional planes. However, in this embodiment, one-dimensional straight lines are used instead of the two-dimensional PDI plane as described in the previous embodiment. A one-dimensional straight line like this is called a detector.

FIG. 2A illustrates a process flow for performing motion analysis on video frames according to one embodiment. In FIG. 2A, given a set of data items (at block 310), a motion model is located in a video frame (at block 320). At block 330, the data items fitting the motion model are removed. This locating and removing process is repeated until the last motion model has been found (block 340). It may be assumed that all the motion models have been found if the termination criterion is satisfied. For example, the termination criteria may be specified as the number of prominent motion model to be detected, or the percentage of the data items to be removed, among other examples.

FIG. 2B illustrates a process flow for locating a motion model in video frames (as in block 320), according to one embodiment. In FIG. 2B, at block 410, three non-parallel straight lines are randomly chosen and the third line is selected as the current detector. At block 420, a one-dimensional voting array is generated to map the solution subspace defined by the detector. This procedure assumes that the detector is described by a straight line $X_0+x\vec{O}$, where $X_0$ is a fixed point the line goes through, $\vec{O}$ is the orientation of the line, which is a normalized four-dimensional vector, and x is a varying scalar that can be seen as the internal coordinate of each point on the detector. For example, the internal coordinate x of $X_0$ is 0.

Given a data item corresponds to a two-dimensional plane defined by the equations $B_k = A_k^T X$, the internal coordinate x of its projection on the detector may be obtained by calculating $$x = [\vec{O}^T A_k (A_k^T A_k)^{-1} A_k^T \vec{O}]^{-1}[$$
$$\vec{O}^T A_k (A_k^T A_k)^{-1}(B_k - A_k^T X_0)] \quad (18)$$

At block 430, data item projections are computed by equation 18, and used for voting. Unlike the previous embodiment, an intersection point may not be found in the four-dimensional parameter space between the one-dimensional detector and a data item because a one-dimensional straight line provides three equations. Together with the two equations given by the data item, a total of five equations over-constraint a solution in a four-dimensional space. Therefore, the data item's projection on the detector is computed instead of the intersection. That is, a point on the detector needs to be found that is closest to the data item two-dimensional plane. The vote is weighed by the angle between the data item $B_k = A_k^T X$ and the detector $X_0+x\vec{O}$. Here, more weight is put on the data item with an angle closer to a right angle.

In this embodiment, the angle θ is computed as:

$$\theta = \arccos(\vec{O}^T C_2 C_2^T \vec{O}), \quad (19)$$

where $C_2$ is the right half of S matrix that is produced by the singular value decomposition of $A_k^T$.

In addition, a vote cast by each data item is weighed by the distance between the data item and the detector. Here, more weight is put on the data item with the shorter distance. In one embodiment, this distance is defined as the shortest distance between an arbitrary point in the data item (a two-dimensional plane) $B_k = A_k^T X$ and an arbitrary point in the detector (a one-dimensional line) $X_0+x\vec{O}$.

In this embodiment, a distance r is computed as:

$$r = \{[B_k - A_k(X_0+x\vec{O})]^T(A_k^T A_k)^{-1}[B_k - A_k(X_0+x\vec{O})]\}^{1/2} \quad (20)$$

where, x is given by equation (18).

At block 440, the global maximum in the voting array is located. The maximum in the voting array reveals the place on the detector where the data item projections are dense.

Until the motion model is located in the image space (at block 450), a new detector is chosen at the end of each iteration (at block 460), that goes through the point of the densest data item projection on the old detector, and is substantially perpendicular to the old detector. This problem can be stated as, given a fixed point $X_{0,new}$ and three old detectors, $X_{0,a}+x\vec{O}_a$, $X_{0,b}+x\vec{O}_b$, and $X_{0,c}+x\vec{O}_c$; where a new detector needs to be found, $X_{0,new}+x\vec{O}_{new}$, so that $\vec{O}_{new}$ is perpendicular to $\vec{O}_a$, $\vec{O}_b$, and $\vec{O}_c$. It is assumed that $\vec{O}_a$, $\vec{O}_b$, and $\vec{O}_c$ are non-paralleled orientations. Here, two different equations may be used to compute $\vec{O}_{new}$.

Performing a singular value decomposition on the matrix $[\vec{O}_a \ \vec{O}_b \ \vec{O}_c]$ forms a 4×3 matrix using the first equation as, $$SVD^T = svd([\vec{O}_a \vec{O}_b \vec{O}_c]) \quad (21)$$

where $\vec{O}_{new}$ can be chosen as the left most column of the S matrix.

Alternatively, a second equation may be used to compute $\vec{O}_{new}$. Removing the first row of $[\vec{O}_a \ \vec{O}_b \ \vec{O}_c]$ gives a 3×3 matrix $\Theta_1$; removing the second row, instead of the first row, gives a 3×3 matrix $\Theta_2$; Similarly, removing only the third row gives a matrix $\Theta_3$; and finally by removing only the fourth row, one has a matrix $\Theta_4$. Computing the determinants of these 3×3 matrices produces a vector:

$$\tilde{O}_{new} = \begin{bmatrix} det(\Theta_1) \\ det(\Theta_2) \\ det(\Theta_3) \\ det(\Theta_4) \end{bmatrix}. \quad (22)$$

where $\vec{O}_{new}$ is determined by normalizing $\tilde{O}_{new}$:

$$\vec{O}_{new} = \tilde{O}_{new}/(\tilde{O}_{new}{}^T \tilde{O}_{new})^{1/2}. \quad (23)$$

It is well known that in the four-dimensional space, up to three unparallel orientations are needed to define a unique perpendicular orientation. In this embodiment, the three most recent detectors are used in choosing the new detector. For example, before the first iteration, three non-parallel straight lines, A, B and C are randomly chosen. C is used as the first detector in the first iteration. At the end of the iteration, a new detector, D is chosen which is perpendicular to A, B and C. At the end of second iteration, the new detector E is chosen that is perpendicular to B, C and D. Similarly, the third iterations yield a new detector F that is perpendicular to C, D and E. Hence, the iterations are repeated using a new detector each time that is perpendicular to the three most recent detectors.

In the motion analysis problem, computations for video motion analysis may be simplified, given the matrices in the data pool (17) having the format of $$\begin{bmatrix} 1 & 0 \\ 0 & 1 \\ p_x & p_y \\ p_y & -p_x \end{bmatrix}.$$

The top half being a 2×2 identity matrix, the bottom half created by only two variables, $p_x$ and $p_y$. Taking this format into account, the computations of x, r and $\theta$, as discussed may be simplified, where the elements in vector $B_k$, $X_0$ and $\vec{O}$ are defined as:

$$B_k = \begin{bmatrix} b_{k,1} \\ b_{k,2} \end{bmatrix}, X_o = \begin{bmatrix} x_{0,1} \\ x_{0,2} \\ x_{0,3} \\ x_{0,4} \end{bmatrix} \text{ and } \vec{O} = \begin{bmatrix} o_1 \\ o_2 \\ o_3 \\ o_4 \end{bmatrix} \quad (24)$$

and seven temporary variables are defined as:

$d_0 = 1 + p_x^2 + p_y^2,$ $d_1 = o_1 + p_x o_3 + p_y o_4,$ $d_2 = o_2 + p_y o_3 - p_x o_4,$ $d_3 = b_{k,1} - x_{0,1} - p_x x_{0,3} - p_y x_{0,4},$ $d_4 = b_{k,2} - x_{0,2} - p_y x_{0,3} + p_x x_{0,4},$ $d_5 = -p_x o_1 - p_y o_2 + o_3,$ $d_6 = -p_y o_1 + p_x o_2 + o_4.$ \quad (25)

Therefore, x in equation (18) is defined by:

$$x = \frac{d_1 d_3 + d_2 d_4}{d_1^2 + d_2^2} \quad (26)$$

r in equation (20) is defined by:

$$r = \left[ \frac{(d_3 - x d_1)^2 + (d_4 - x d_2)^2}{d_0} \right]^{1/2} \quad (27)$$

and, $\theta$ in equation (19) is defined by:

$$\theta = \arccos\left( \frac{d_5^2 + d_6^2}{d_0} \right) \quad (28)$$

Thus, an alternative implementation of Hough transform to perform motion analysis on video frames is described using one-dimensional detectors instead of four-dimensional primary data items. In this way, additional memory is further saved in this implementation, because the one-dimensional memory array is used to map a detector, instead of the two-dimensional voting array for a PDI or the four-dimensional voting array in conventional implementations. It should also be appreciated that since the voting array is one-dimensional, the filtering, and maximum locating operations are simpler. That is, since the filtering and maximum locating are performed on a one-dimensional voting array, rather than a two-dimensional voting array as in the previous embodiment, the computation is simpler.

Figure 4:
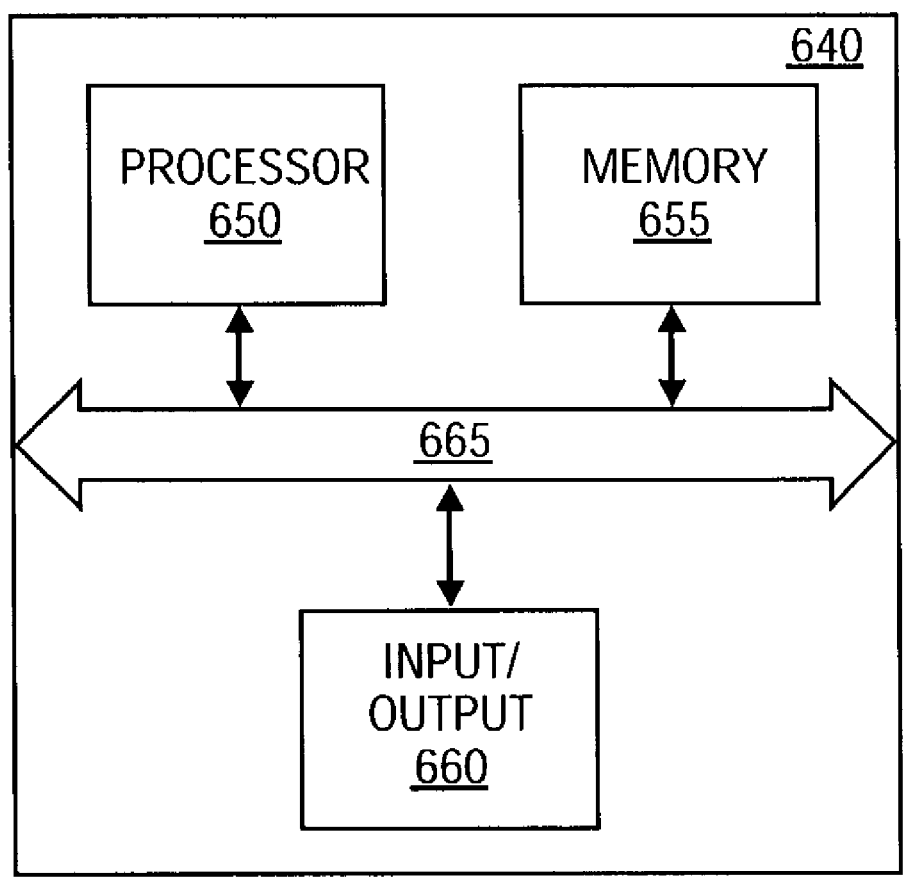
FIG. 4 illustrates a computer system for performing the embodiments of the implementations of the Hough transform.

One embodiment of a computer system suitable for performing the implementations of Hough transform disclosed above is illustrated in FIG. 4. The computer system 640, includes a processor 650, memory 655 and input/output capability 660 coupled to a system bus 665. The memory 655 is configured to store instructions which, when executed by the processor 650, perform the methods described herein. The memory 655 may also store the one-dimensional voting arrays, one-dimensional detectors, and two-dimensional primary data items, as disclosed. Input/output 660 provides for the delivery and display of the video content or portions or representations thereof. Input/output 660 also encompasses various types of computer-readable media, including any type of storage device that is accessible by the processor 650. One of skill in the art will immediately recognize that the term "computer-readable medium/media" further encompasses a carrier wave that encodes a data signal. It will also be appreciated that the computer system 640 is controlled by operating system software executing in memory 655.

It should be appreciated that more or fewer processes may be incorporated into the method(s) illustrated in FIGS. 1A–B and 2A–B without departing from the scope of the invention and that no particular order is implied by the arrangement of blocks shown and described herein. It should be further appreciated that the method(s) described in conjunction with FIGS. 1A–B and 2A–B may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result.

It should be appreciated by one of ordinary skill in the art that in the process flow of FIGS. 1A–B and 2A–B, once a motion model is found in a frame, it may be saved for comparison with a subsequent frame to perform motion analysis. Furthermore, it should also be understood that although the invention has been described to perform line detection, and motion analysis, for the purpose of detecting lines in an image, or finding global motion models for motion-based video segmentation, alternative embodiments of the described implementation of Hough transform may be applied in tasks such as MPEG4 video compression (Motion Picture Experts Group video compression), robotic vision, image comparing and object recognition, as well as other applications well known to those of ordinary skill in the art, which may use a parameter estimator for multi-dimensional features.

While the invention has been described in terms of several embodiments, those skilled in the art will recognize that the invention is not limited to the embodiments described. The method and apparatus of the invention can be practiced with modification and alteration within the scope of the appended claims. The description is thus to be regarded instead of limiting on the invention.

What is claimed is:

1. A method of detecting one or more lines in an image comprising:
    selecting a primary data item from feature points in an image space, the feature points defining one-dimensional P-lines in a corresponding parameter space;
    mapping the P-line of the primary data item with a one-dimensional voting array in the parameter space;
    locating one or more intersections between the P-line corresponding to the primary data item and P-lines corresponding to the other feature points, each intersection represented by a cell in the voting array;
    establishing an I-line in the image space corresponding to a location in the parameter space where the intersections substantially converge; and
    identifying, as a subsequent primary data item, a feature point corresponding to a P-line that is substantially perpendicular to the P-line of a current primary data item and further intersects the P-line of the current primary data item substantially close to a cell in the voting array associated with a global maximum vote.

2. The method of claim 1, wherein the establishing the I-line in the image space includes identifying a location in the parameter space where the intersections substantially converge with a cell in the voting array associated with a global maximum vote.

3. The method of claim 1, further comprising:
    removing the feature points from the image space fitting the I-line.

4. A system comprising:
    a processor coupled to a memory through a bus; and
    a detection process executed from the memory by the processor to cause the processor to select a primary data item from feature points in an image space, the feature points defining one-dimensional P-lines in a corresponding parameter space, map the P-line of the primary data item with a one-dimensional voting array in the parameter space, locate one or more intersections between the P-line corresponding to the primary data item and P-lines corresponding to the other feature points, each intersection represented by a cell in the voting array, establish an I-line in the image space corresponding to a location in the parameter space where the intersections substantially converge, and identify, as a subsequent primary data item, a feature point corresponding to a P-line that is substantially perpendicular to the P-line of a current primary data item and further intersects the P-line of the current primary data item substantially close to a cell in the voting array associated with a global maximum vote.

5. The system of claim 4, wherein the detection process further causes the processor, when establishing the I-line in the image space, to identify a location in the parameter space where the intersections substantially converge with a cell in the voting array associated with a global maximum vote.

6. The system of claim 4, wherein the detection process further causes the processor to remove the feature points from the image space fitting the I-line.

7. A system comprising:
    a means for processing coupled to a means for storing instructions for the means for processing through a means for communicating; and
    a detection process executed from the means for storing by the means for processing to cause the means for processing to select a primary data item from feature points in an image space, the feature points defining one-dimensional P-lines in a corresponding parameter space, map the P-line of the primary data item with a one-dimensional voting array in the parameter space, locate one or more intersections between the P-line corresponding to the primary data item and P-lines corresponding to the other feature points, each intersection represented by a cell in the voting array, establish an I-line in the image space corresponding to a location in the parameter space where the intersections substantially converge, and identify, as a subsequent primary data item, a feature point corresponding to a P-line that is substantially perpendicular to the P-line of a current primary data item and further intersects the P-line of the current primary data item substantially close to a cell in the voting array associated with a global maximum vote.

8. The system of claim 7, wherein the detection process further causes the means for processing, when establishing the I-line in the image space, to identify a location in the parameter space where the intersections substantially converge with a cell in the voting array associated with a global maximum vote.

9. The system of claim 7, wherein the detection process further causes the means for processing to remove the feature points from the image space fitting the I-line.

10. A computer-readable medium encoded with computer-executable instructions to cause a computer to perform a method of detecting one or more lines in an image, the method comprising:

selecting a primary data item from feature points in an image space, the feature points defining one-dimensional P-lines in a corresponding parameter space;

mapping the P-line of the primary data item with a one-dimensional voting array in the parameter space;

locating one or more intersections between the P-line corresponding to the primary data item and P-lines corresponding to the other feature points, each intersection represented by a cell in the voting array;

establishing an I-line in the image space corresponding to a location in the parameter space where the intersections substantially converge; and identifying, as a subsequent primary data item, a feature point corresponding to a P-line that is substantially perpendicular to the P-line of a current primary data item and further intersects the P-line of the current primary data item substantially close to a cell in the voting array associated with a global maximum vote.

11. The computer-readable medium of claim 10, wherein the establishing the I-line in the image space includes identifying a location in the parameter space where the intersections substantially converge with a cell in the voting array associated with a global maximum vote.

12. The computer readable medium of claim 10, further comprising: removing the feature points from the image space fitting the I-line.

* * * * *